(No Model.)

A. G. PROVINE.
SPRAYER.

No. 544,930.

3 Sheets—Sheet 1.

Patented Aug. 20, 1895.

WITNESSES:

INVENTOR
A. G. Provine
BY Munn & Co
ATTORNEYS.

(No Model.) 3 Sheets—Sheet 3.

A. G. PROVINE.
SPRAYER.

No. 544,930. Patented Aug. 20, 1895.

WITNESSES:
Chas. Nida.
J. L. McAuliff

INVENTOR
A. G. Provine
BY
Munn & Co.
ATTORNEYS.

UNITED STATES PATENT OFFICE.

ALBERT G. PROVINE, OF PUYALLUP, WASHINGTON.

SPRAYER.

SPECIFICATION forming part of Letters Patent No. 544,930, dated August 20, 1895.

Application filed March 16, 1894. Serial No. 503,870. (No model.)

*To all whom it may concern:*

Be it known that I, ALBERT G. PROVINE, of Puyallup, in the county of Pierce and State of Washington, have invented new and useful Improvements in Sprayers, of which the following is a full, clear, and exact description.

The invention relates to wheeled sprayers for applying insecticides to plants, trees, and the like, and the object of the invention is to provide an improved sprayer of this character in which the spraying-nozzles are so arranged as to discharge the insecticide in such a manner and under such a pressure as to effectually reach the plants or the like; and a further object is to provide for adjusting the groups of nozzles toward or from each other according to the width of the rows of plants, and also to provide for automatically maintaining the nozzles in vertical position irrespective of any unevenness of the ground.

Finally, the invention embodies various details designed to promote general efficiency in the apparatus.

Reference is to be had to the accompanying drawings, forming a part of this specification, in which similar letters of reference indicate corresponding parts in all the figures.

Figure 1:
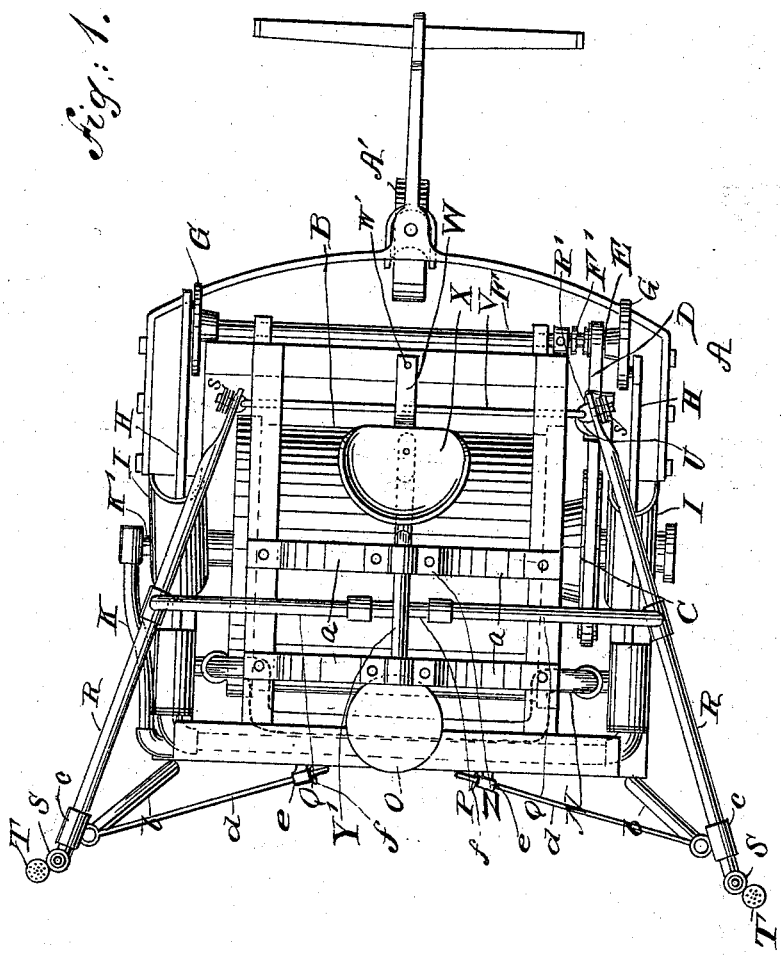
Figure 2:
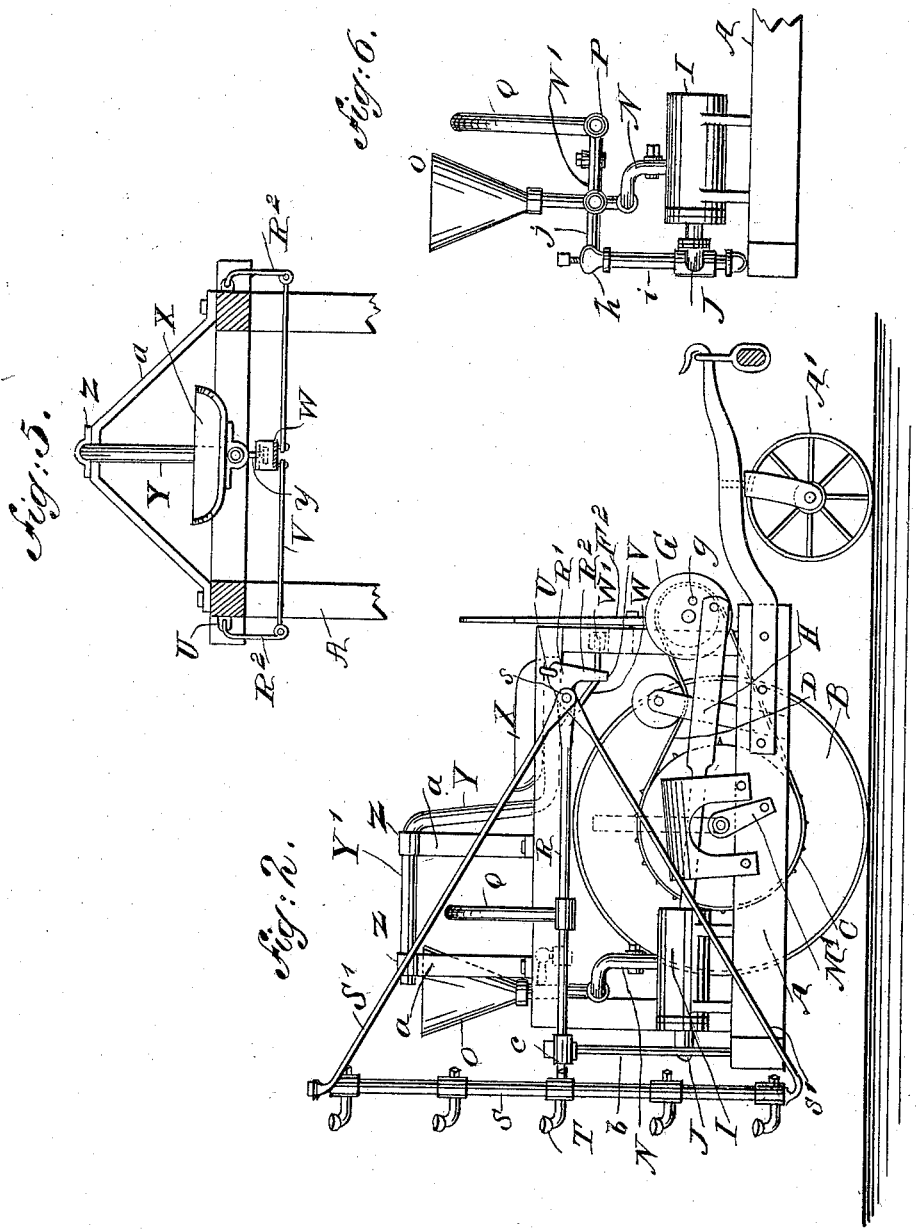
Figure 3:
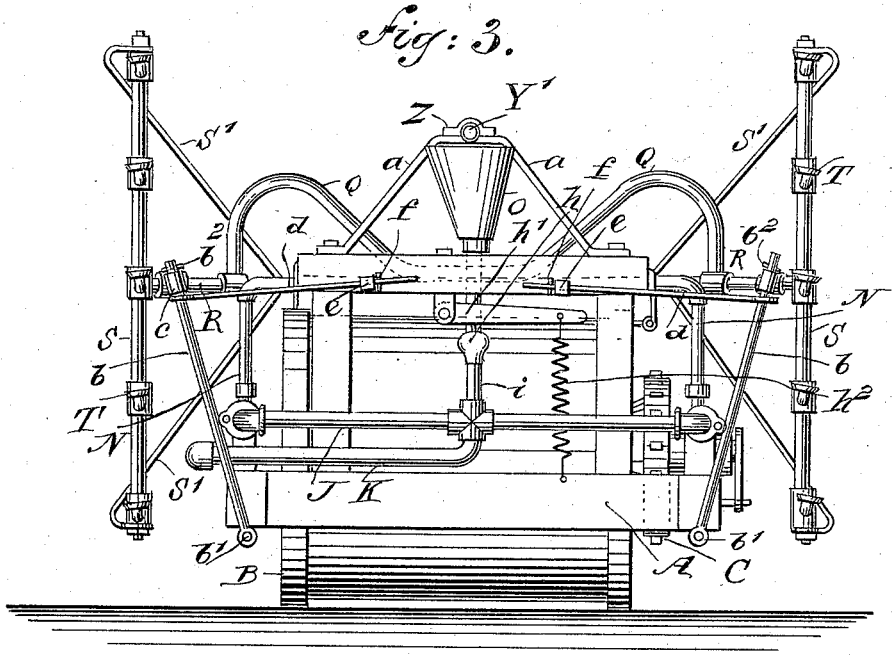
Figure 4:
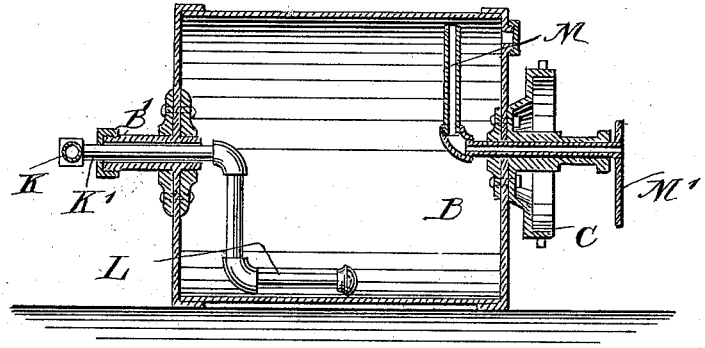

Figure 1 is a plan view of a sprayer constructed in accordance with my invention. Fig. 2 is a side elevation. Fig. 3 is a rear elevation. Fig. 4 is a longitudinal sectional view of the hollow roller for containing a supply of liquid insecticide, and Figs. 5 and 6 are detail views to be hereinafter referred to.

In constructing a sprayer in accordance with my invention, the framework A is of suitable form and strength to support the several parts and is provided with a proper pole or tongue for the attachment of the draft-animals, the tongue having, preferably, a caster-wheel A', which will readily follow the lateral movements of the tongue and guide the structure in turning. On the frame A is suitably mounted a hollow roller B, adapted to contain a supply of liquid insecticide, and said roller is provided on one end of its axle with a chain wheel C, which is geared by a belt D to a chain wheel E on the main shaft F, which latter is provided with the crank-disks G, to which are connected the pitmen H of the pumps I, the shaft having a clutch F', operated by a lever F² for throwing the crank-disks into and out of operation. The pumps are mounted low on the frame A for giving greater steadiness to the machine. Branch pipes J at the rear of the machine connect the pumps with the suction-pipe K, the latter extending from said pipes J around to one end of the roller B and entering, as at K', through the journal B' of the roller, the suction-nozzle L being arranged within the roller at the bottom and provided with a suitable strainer. A vent-pipe M extends into the roller B, through the opposite journal to near the top thereof, and is suitably supported at the exterior against rotation, as at M'.

The discharge-pipe N from each pump I leads upward to the top of the machine, where it has suitable connection with an air-chamber O, and by a pipe N' with the pipe P, to which are connected sections of hose Q, and said sections of hose deliver to pipes R, one of which ranges longitudinally of the machine at each side, each of the said pipes R having a closed front end which is loosely supported to permit certain adjustment, as hereinafter explained. The rear end of the pipe R leads to and supports the vertical pipe S (of which one is provided at each side of the machine) and the latter is provided with a series of roses or discharge-nozzles T, one above the other.

The front ends of the pipes R are so formed as to permit a loose connection with eyebolts U or the like on the frame A, as at R', and are provided with depending arms R², with which are connected the links V, Figs. 1 and 5, the transversely-ranging links from each side of the machine being connected at about the center of the machine with a bar W, the front end of which bar is pivoted, as at W', to a transverse member or part of the frame A. The rear end of the bar W extends beneath the seat X, and a stud y on the swinging supporting-bar Y of the seat engages the bar W, the latter being slotted for the purpose. The supporting-bar Y extends horizontally beneath the seat and carries the latter, and said bar Y is of crank formation and extends upwardly from the seat and then rearwardly, as at Y', where it is supported in bearings Z, formed on or secured to the brackets a. Thus it will be seen that the weight of the driver on the seat X will maintain the latter in a horizontal position, the bar Y being free to rock in its bearings, and when the machine rises at one side, as for instance on a side hill, the seat will maintain its horizontal position, and acting through the bar Y, links V, and arms R², will rock the pipes R and thus maintain the vertical pipes S, carrying the discharge-nozzles, in the vertical plane, notwithstanding the tilting of the machine, with the result that the pipes S will be prevented from damaging contact with the rows of plants or trees. It will be observed by reference to Fig. 5 that during such rocking movement the pipes R will swing about axes that extend longitudinally of the sprayer and, as shown, are horizontal or approximately so.

Provision is made for adjusting the nozzle-carrying pipes S toward and from each other, as desired, by the following devices: At the rear of the machine, near each side, a bar $b$ is arranged, its lower end having a suitable pivotal connection with the frame A, as at $b'$, and said bar at its upper end passes through a socket or eye $c$, carried by the pipes R, adjacent to the vertical pipes S. The bar $b$ passes also through one end of a horizontal bar $d$, which ranges transversely of the machine and passes through a guide-eye $e$ on the machine-frame, and by moving the bars $b$ toward or from each other the pipes R, and with them the nozzle-carrying pipes S, will be adjusted accordingly, the pipes R readily swinging on their connections at U. The bars $b$ and $d$ are formed, in practice, with a longitudinal series of apertures for receiving split pins or cotters $b^2$ $f$, which retain the parts in the adjusted position. The vertical pipes S are braced by the rods S' that are secured thereto at top and bottom, the opposite ends of the braces converging and being suitably fastened to the front end of the pipe R, as at $s$. The crank-disks G preferably are provided with two or more apertures $g$ at different distances from the center, whereby the position of the wrist-pins of the pitmen H may be shifted to increase or diminish the stroke of the pumps.

The machine is provided with a blow-off valve $h$, having a connection $i$ with pipes J, and a connection $j$, Fig. 6, leading to the discharge-pipes and air-chamber.

The bunching or clustering of the discharge-nozzles by arranging them on the single vertical pipe at each side affords the proper pressure, and this, with the vertical series of nozzles, is efficient in reaching the plants; also, the general structure of the machine, with the adjustments specified, affords a proper equipment for the intended service.

Having thus described my invention, I claim as new and desire to secure by Letters Patent—

1. In a spraying machine, the combination with a vertical nozzle-carrying pipe, and a supply pipe connected therewith, adapted to be rocked, of a swinging driver's seat, and connections between said seat and the said supply pipe, for causing the nozzle-carrying pipe to respond to the movement of the seat, thereby maintaining the nozzle-carrying pipe in the vertical position, substantially as described.

2. In a spraying machine, the combination with the pumps and a source of supply therefor, of a longitudinally-ranging pipe at each side of the machine, to which the pumps discharge, said pipes being pivotally supported at their front ends and provided with vertical pipes provided with discharge nozzles, the pivoted pipes being also adjustable toward and from each other, substantially as described.

3. The combination, with the pumps and a source of supply therefor, of longitudinally ranging pipes at the sides of the machine, adjustable toward and from each other, pivoted bars connected with said longitudinal pipes, adapted to move the same, guide bars for guiding the pivoted bars, and means for locking the parts in the adjusted position, substantially as described.

4. The combination of the hollow roller, the pumps, the suction pipes of which have connection with the hollow roller, discharge pipes including flexible hose, pipes ranging longitudinally at the sides, to which said hose deliver, said longitudinal pipes having pivotal supports permitting them to rock transversely of the machine, and also permitting them to be swung toward and from each other, vertical pipes having vertical series of discharge nozzles said vertical pipes being supported from the longitudinal pipes, means for rocking said longitudinal pipes, and means for swinging the same toward and from each other, substantially as described.

5. In a spraying machine, the nozzle-carrying pipes disposed vertically at each side of the machine, and having each the vertical series of discharge nozzles, whereby the pressure of the pumps will be concentrated, the vertical series of nozzles and the concentrated pressure thus increasing the efficiency of the machine, in combination with pipes supporting the said nozzle-carrying pipes and pivotally connected with the machine frame to rock transversely thereof so as to maintain the nozzle-carrying pipes in a vertical position, means for rocking the supporting pipes and with them the nozzle-carrying pipes, and means for swinging said supporting pipes toward and from each other, substantially as described.

ALBERT G. PROVINE.

Witnesses:
RODERICK MCDONALD,
R. E. CRANE.